United States Patent [19]

Fricke et al.

[11] Patent Number: 4,887,876
[45] Date of Patent: Dec. 19, 1989

[54] ELECTRICAL CONNECTOR INCLUDING LIGHT-CONDUCTING MEANS

[75] Inventors: Herbert Fricke; Klaus Strate; Manfred Wilmes; Arian Frikkee, all of Detmold, Fed. Rep. of Germany

[73] Assignee: C. A. Weidmueller GmbH & Co., Detmold, Fed. Rep. of Germany

[21] Appl. No.: 267,926

[22] Filed: Nov. 7, 1988

[30] Foreign Application Priority Data

Nov. 7, 1987 [EP] European Pat. Off. ........ 87116480.2

[51] Int. Cl.⁴ .............................................. G02B 6/36
[52] U.S. Cl. .................................. 350/96.2; 350/96.15
[58] Field of Search ................. 350/96.2, 96.21, 96.15

[56] References Cited

U.S. PATENT DOCUMENTS 4,268,756  5/1981  Crouse et al. ...................... 250/551
4,762,388  8/1988  Tanaka et al. ..................... 350/96.2
4,798,440  1/1989  Hoffer et al. ...................... 350/96.2
4,802,725  2/1989  Borne et al. ...................... 350/96.2

FOREIGN PATENT DOCUMENTS 3005652  6/1981  Fed. Rep. of Germany .
3233153  8/1984  Fed. Rep. of Germany .

Primary Examiner—John D. Lee
Assistant Examiner—John Ngo
Attorney, Agent, or Firm—Laubscher, Presta & Laubscher

[57] ABSTRACT

An electrical connector or terminal block (1) is adapted for mounting on a printed circuit board or the like (2) at a position at least partially concealing a luminous diode (3), the connector containing a light-conductive member (4) that extends from the luminous diode to an exposed surface (5) of the connector, thereby to present a visible indication of the state of operation of the diode.

9 Claims, 2 Drawing Sheets

ELECTRICAL CONNECTOR INCLUDING LIGHT-CONDUCTING MEANS

STATEMENT OF THE INVENTION

The present invention relates to an electrical connector that contains light-conductive means for presenting to an exposed surface of the connector a visible indicator of the state of operation of a luminous diode that is mounted on a printed circuit board and is at least partially concealed by the connector.

BRIEF DESCRIPTION OF THE PRIOR ART

In many types of electrical connector devices —such as terminal blocks, connector bars, and the like—it is often desirable to provide light indicator means for indicating the operating status of selected current paths, for example, for each terminal pole. Quite often, in addition to the electrical connector means provided on the printed circuit board, additional plug bars are attached in spaced relation adjacent the connector devices in associated relation to luminous diodes, respectively, mounted on the printed circuit board. This is rather structurally laborious and expensive, and it utilizes additional space on the conductor plate which makes inspection of the apparatus difficult, because in this case, the luminous diode is spaced relatively far away from the current path or the terminal pole with which it is associated. It is also proposed to use special luminous diodes having very long connecting legs or long special housings, so that one can mount them in spatial relation adjacent the connecting elements on the printed circuit board, and further to cause the luminous diode to be bent and placed adjacent a visible surface of the connecting element and to fix it in place there. This again requires considerable structural effort, and requires accessibility sectors along the outside surface of the connection elements. In this regard, reference is made to the German patent No. 3233153 C2, wherein it is known to integrate special luminous diodes with particularly long connecting legs arranged already within the interior of the connecting elements. Here again, the manufacturing techniques are rather difficult, because first of all it is necessary to mount the luminous diodes in the electrical connectors in such a manner that will facilitate their visibility along one of the exposed surfaces of the connector, and after that, one must do further assembly work in order to guarantee electrical contact between the luminous diodes and the printed circuit board.

The present invention was developed to provide a printed circuit board connector of this general type which will facilitate particularly simple integration both as regards as to manufacturing and as to design.

SUMMARY OF THE INVENTION

Accordingly, a primary object of the invention of the present invention is to provide an electrical connector adapted for connection with a printed circuit board or the like having mounted thereon a luminous diode that is at least partially concealed by the connector when it is electrically connected with the printed circuit board, the body of the connector containing a passage that receives a light-conducting rod for transmitting light from the luminous diode to an exposed surface of the connector, thereby to provide a visual indication of the status of the diode.

By means of this design, commercially available luminous diodes may be electrically mounted upon the printed circuit board at required points through the use of customary connection techniques in a simple manner, preferably in a fully automatic fashion. Following this, the electrical connectors are connected with the printed circuit board using customary connection techniques and finally, light conducting rod means provided in the connector serve to transmit light in a simple manner from the luminous diode to an opening contained in a visible surface of the connector. The light conducting rod, or other suitable light-conducting element, is preferably inserted in a corresponding recess contained in the connector. Furthermore, the various connector parts may be made of a light-conducting material by injection molding techniques in a highly simple fashion, whereby the light-conducting element may be attached to the connector by means of a simple plug-type connection with or without conventional blocking means between the elements, whereby the light-conducting members might be provided with specially structured luminous heads, or there might also be the possibility of providing at the head or cap portion of the light conducting member, additional or auxiliary light conducting members leading to a collective group indication board. The light conducting members are preferably arranged in receiving passages contained in the conductors, which passages extend at one end to the luminous diodes and at the other end to an exposed surface of the connector. If this is not possible for reasons of space—such as occurs when the use of separate testing plugs or the like is required—there is also provided the possibility, in the event of corresponding arrangement luminous diodes, to mount the normal light conducting members in place by means of the receiving devices which support the light connecting members.

According to a more specific object of the invention, the light conducting rods are provided with cap or head members formed of light-conductive material, which members are received in an adapter body which also receives one end of an auxiliary light conducting rod, the adapter body being sectional and including a cover member that is adapted to be locked to a body section, thereby to mount the auxiliary light conducting rod in place.

BRIEF DESCRIPTION OF THE DRAWINGS

Other objects and advantages of the invention will become more apparent from a study of the following specification, when viewed in the light of the accompanying drawings, in which.

DETAILED DESCRIPTION

Figure 1:
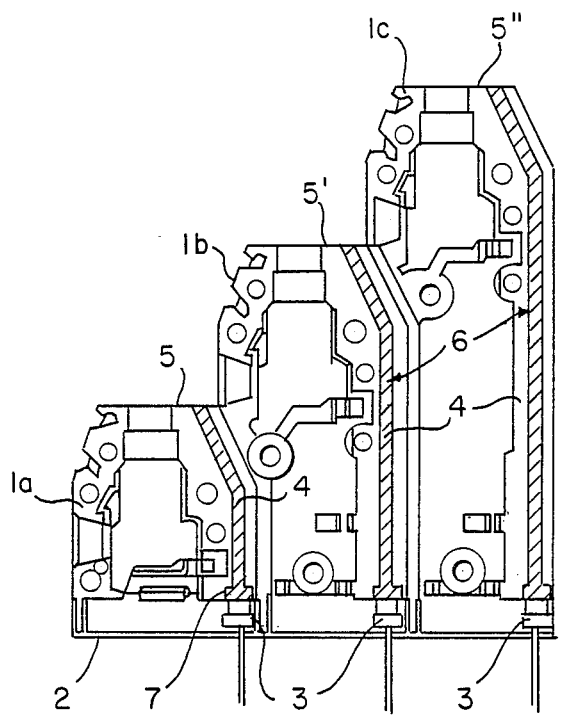
FIG. 1 is a side view of a multi-contact connector assembly in which the connector bodies are mounted in side-by-side laterally-stacked relation.
Figure 3:
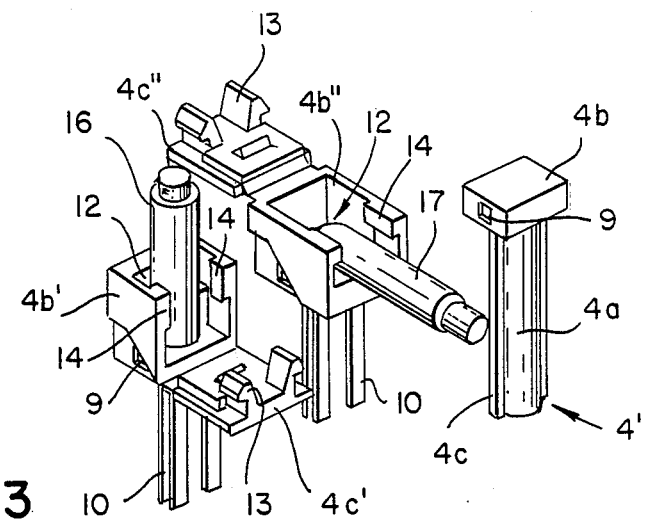
FIG. 3 is an exploded detailed perspective view of the components of the invention of FIG. 2.

Referring first more particularly to FIG. 1, the electrical connector assembly includes a plurality of laterally-stacked connector bodies 1a, 1b, 1c, which are permanently or removably connected with a printed circuit board 2. In order to provide an indication of the operation of various circuits on the printed circuit board, there are provided a plurality of luminous diodes 3 that are electrically connected with circuits on the board by conventional techniques prior to the mounting of the corresponding connector device 1, 1', or 1".

Thus, in the example of FIG. 1, there are provided passages in the adjacent surfaces of the connector blocks for receiving light-conducting members 4 that extend at one end adjacent the luminous diodes 3 and at the other end adjacent exposed surfaces 5, 5' and 5" on the connector bodies, respectively. In the embodiment of FIG. 1, the luminous diodes are received in a hollow base area of the associated connector body, and furthermore for each connector, six passages are provided which lead from the luminous diodes to the exposed surfaces of the connector bodies. The light conducting elements 4 which are mounted in the passages are, in the simplest case, correspondingly long commercially available light conductors, such as light conducting rods. The light conducting members are provided with small foot portions 7 by means of which they are mounted in corresponding recesses contained in the base of the associated connector body.

When using such light-conductive members 4, they may readily be curved, as shown in FIG. 1, and in accordance with the particular configuration of the connector bodies, the end of the light conducting member remote from the luminous diode may be positioned at any desired location on the corresponding exposed surface 5, 5' or 5".

Figure 2:
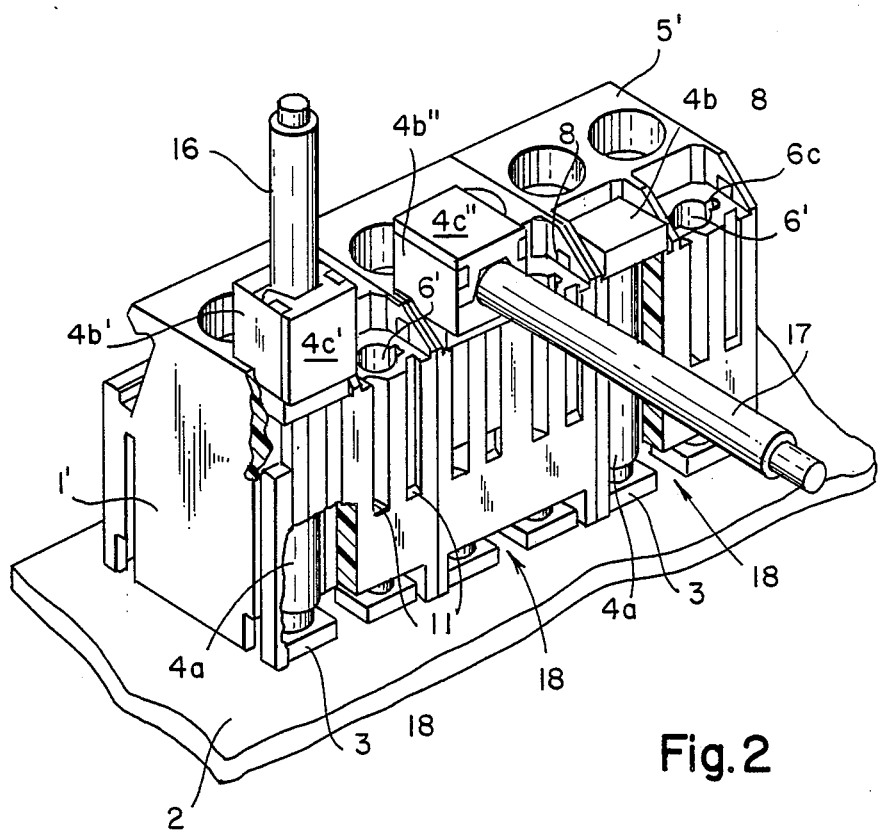
FIG. 2 is a perspective view of a preferred embodiment of the invention.

Referring now to the preferred embodiment of FIG. 2, the connector bodies 1' are of identical construction and are arranged in laterally-stacked relation. The luminous diodes 3 are electrically connected with circuits (now shown) on the printed circuit board 2, by customary electrical connection techniques. Following the mounting of the luminous diodes 3, the connector bodies 1' are either permanently or removably connected with the printed circuit board in such a manner as to at least partially conceal the luminous diodes, which diodes are contained in corresponding recesses 18 provided in the base portions of the connector bodies. In the illustrated embodiment, the recesses 18 are of sufficient size to receive a pair of luminous diodes 3. The connector bodies 1' are preferably molded from a suitable electrical insulation material, and contain through passages 6' that extend from a position adjacent the luminous diodes and through the connector body toward an exposed surface 5' thereof.

The light-conductive members 4 are preferably formed by injection molding from a suitable synthetic plastic material and include a shaft portion 4a that is adapted to extend within the passage 6', and an associated cap or head portion 4b that is associated with the upper end of the shaft portion 4a. Of course, it is possible to use a light conducting member having only the shaft portion 4a, which shaft portion has a length sufficiently long that it will protrude somewhat from the exposed surface 5'.

In the illustrated embodiment, the shaft portion 4a is provided with lateral guide rails 4c that extend within corresponding grooves 6c contained in the walls of the through hole passages 6', thereby to assure proper orientation of the cap portion 4b relative to the connector body 1'. In order to block the light conducting member in place, the cap portion 4b may be provided with lateral recesses 9 that receive corresponding stop projections 8 provided on the connector bodies. Thus, the light conducting rods are locked in a definite orientation relative to the connector bodies 1' and are prevented from inadvertently falling out of their respective bores. The cap portions 4b may be fabricated in such a manner as to increase the visibility of the end portion of the light-conducting member, and consequently the operating condition of the associated luminous diode.

Furthermore, it is apparent that the passages 6' might be arranged in such a manner as to terminate at one end in either the front or the rear vertical surface of the connector body, and the associated light-conducting rod would then have a corresponding curved configuration.

While the light-conducting member 4' has been illustrated as being of unitary construction, it is also possible to form the shaft portion 4a and the cap portion 4b as separate cooperating units. In this case, the separate shaft portion 4a might be inserted within the passage 6' whereupon the separate cap member 4b would be fastened to the associated connector body 1' to maintain the shaft member 4a in place. Thus, the cap member 4b may be provided with legs 10 that extend downwardly and have external dovetail surfaces adapted for cooperation with corresponding grooves 11 of dovetail cross-section contained in the associated wall surface of the connector body 1'.

It is also desirable to conduct the light from the luminous diode 3 and the light-conducting member 4 either vertically or horizontally away from the exposed surface 5' of the connector body. To this end, there are provided auxiliary cap members 4b' and 4b". The adapter cap member 4b' and 4b" are of sectional construction and include pivotally connected cover portions 4c' and 4c", that are operable to at least partially enclose recesses 12 formed in the auxiliary cap members. In the illustrated embodiment, the auxiliary cap member 4b' receives the lower end of a vertically-arranged auxiliary light-conducting rod 16, and the auxiliary cap member 4b" contains a recess 12 that receives one end of a horizontally arranged light conducting rod 17. In each case, the cover sections 4c' and 4c" are fastened in the closed position by the cooperation between locking projections 13 on the cover section and corresponding shoulders 14 on the adapter body section. In the event that such a design is not possible, such as for example occurs when possible passage through holes are needed for testing plugs or the like, a comparable adapter member formed of light-conducting material may be provided on the reverse side of the connector body, for example by means of a plug connection similar to the plug feet 10 and corresponding grooves 11 of the design version according to FIG. 2.

While in accordance with the Patent Statutes the preferred forms and embodiments of the invention have been illustrated and described, it will be apparent that other changes and modifications may be made in the apparatus described without deviating from the inventive concepts set forth above.

What is claimed is:

1. An electrical connector adapted for connection with a conductor plate (2) and operable to indicate the status of a luminous diode (3) electrically connected with the plate, comprising:
    (a) a connector body (1') adapted for mounting on the conductor plate in such a manner as to at least partially conceal the luminous diode, said connector body containing an internal passage (6') extending from said luminous diode to an exposed surface (5') of the body;
    (b) light-conducting means including a first light-conducting member (4a) mounted within said passage and extending at one end adjacent said luminous diode for conducting light from said luminous diode to said exposed surface, said light-conducting means also including an auxiliary light-conducting member (16, 17); and (c) a light-conducting cap member (4b', 4b") arranged in light-conducting relation adjacent the other end of said first member that is remote from said luminous diode, said cap member being sectional and including a body section containing a recess (12) receiving one end of said auxiliary member in light-conducting relation relative to said other end of said first light-conducting member, said cap member also including a cover section (4c', 4c"), and means (13, 14) locking said cover section to said body section to maintain said auxiliary member one end in said recess.

2. Apparatus as defined in claim 1, wherein the light-conducting means comprises at least one light-conducting rod.

3. Apparatus as defined in claim 2, wherein said light-conducting rod is longitudinally curved.

4. Apparatus as defined in claim 1, wherein said light conducting member includes longitudinal guide rail portions (4c) that extend laterally within corresponding guide grooves (6c) contained in the walls of said passages.

5. Apparatus as defined in claim 1, and further including locking means (8, 9) connecting said cap member with said connector body.

6. Apparatus as defined in claim 1, and further wherein said cap member is in the form of a plug having at least one leg portion (10) that extends within a corresponding groove (11) contained in said connector body.

7. Apparatus as defined in claim 1, wherein said connector body contains a recess (18) for at least partially enclosing said luminous diode when said connector body is mounted on said plate.

8. Apparatus as defined in claim 1, including a plurality of said connector bodies arranged in laterally stacked relation, said passage (16) being contained in the rear wall of one of said connector bodies adjacent the front wall of the next connector body of the stack.

9. Apparatus as defined in claim 1, and further including means for mounting said light-conducting members and said cap members independently on said connector body.

* * * * *